US008882346B2

(12) United States Patent
Bombardieri et al.

(10) Patent No.: US 8,882,346 B2
(45) Date of Patent: Nov. 11, 2014

(54) WASHING MACHINE, IN PARTICULAR A LAUNDRY MACHINE OR WASHING/DRYING MACHINE OR A DISHWASHER, EQUIPPED WITH A DEVICE FOR DETECTING THE TEMPERATURE OF THE ELECTRIC RESISTANCE USED FOR WARMING UP THE WASH LIQUID

(75) Inventors: Giovanni Bombardieri, Albino (IT); Mariano Funari, Force (IT); Giuseppina Pia Potena, Fabriano (IT); Costantino Mariotti, Sigillo (IT); Fernanda Gaggioli, legal representative, Sigillo (IT); Maria Angela Mariotti, legal representative, Sigillo (IT); Elisa Mariotti, legal representative, Sigillo (IT)

(73) Assignee: Indesit Company S.p.A., Fabriano (IT)

( * ) Notice: Subject to any disclaimer, the term of this patent is extended or adjusted under 35 U.S.C. 154(b) by 638 days.

(21) Appl. No.: 13/120,201

(22) PCT Filed: Mar. 17, 2009

(86) PCT No.: PCT/IB2009/000533

§ 371 (c)(1),
(2), (4) Date: Sep. 8, 2011

(87) PCT Pub. No.: WO2010/035080

PCT Pub. Date: Apr. 1, 2010

(65) Prior Publication Data

US 2011/0310927 A1 Dec. 22, 2011

(30) Foreign Application Priority Data

Sep. 23, 2008 (IT) .............................. TO2008A0694

(51) Int. Cl.

| | |
|---|---|
| ***G01K 7/16*** | (2006.01) |
| ***D06F 39/04*** | (2006.01) |
| ***H05B 3/82*** | (2006.01) |
| ***A47L 15/42*** | (2006.01) |

(52) U.S. Cl.
CPC *D06F 39/04* (2013.01); *H05B 3/82* (2013.01); *A47L 15/4285* (2013.01); *D06F 2202/04* (2013.01); *D06F 2204/04* (2013.01)
USPC ............ 374/141; 374/185; 374/183; 374/208

(58) Field of Classification Search
USPC .................................. 374/141, 183, 185, 208
See application file for complete search history.

(56) References Cited

U.S. PATENT DOCUMENTS

| | | | | |
|---|---|---|---|---|
| 3,750,429 A * | 8/1973 | Gorsuch | ...................... | 68/12.22 |
| 4,949,536 A * | 8/1990 | Neufeld | ......................... | 56/13.7 |

(Continued)

FOREIGN PATENT DOCUMENTS

| | | |
|---|---|---|
| DE | 10062540 A1 | 6/2002 |
| EP | 0275635 A1 | 7/1988 |
| EP | 0624998 A1 | 11/1994 |

*Primary Examiner* — Mirellys Jagan
(74) *Attorney, Agent, or Firm* — Cesari and McKenna, LLP

(57) ABSTRACT

The present invention relates to a washing machine (2), in particular a laundry washing or washing/drying machine or a dishwasher, comprising: a tub (3) adapted to contain a wash liquid (4), an electric resistance (1) for heating the wash liquid (4), a temperature sensor (5) for detecting the temperature of the wash liquid (4), wherein the resistance (1) and the temperature sensor (5) are put in a condition of thermal exchange by conduction. The invention also relates to a method for evaluating whether the resistance is emerged from or submerged in the wash liquid and to a method for removing calcareous deposits (17) from an electric resistance (1) adapted to heat a wash liquid (4) in a washing machine (2), in particular a laundry washing or washing/drying machine or a dishwasher, characterized in that the resistance (1) is subjected to at least one heating and cooling cycle while the resistance (1) is kept above the wash liquid (4).

14 Claims, 6 Drawing Sheets

(56) References Cited

U.S. PATENT DOCUMENTS

| | | | | |
|---|---|---|---|---|
| 6,488,408 | B1 * | 12/2002 | Laflamme et al. | 374/150 |
| 7,520,145 | B2 * | 4/2009 | Hong et al. | 68/12.27 |
| 7,941,884 | B2 * | 5/2011 | Block et al. | 8/149.3 |
| 2002/0131475 | A1 * | 9/2002 | Woo et al. | 374/141 |
| 2004/0244432 | A1 * | 12/2004 | Kim et al. | 68/5 C |
| 2005/0144734 | A1 * | 7/2005 | Yang et al. | 8/149.3 |
| 2006/0096333 | A1 * | 5/2006 | Park et al. | 68/15 |
| 2006/0191496 | A1 | 8/2006 | Muenzner et al. | |
| 2007/0210107 | A1 | 9/2007 | Pleschinger et al. | |
| 2008/0175572 | A1 * | 7/2008 | Barnes et al. | 392/497 |

* cited by examiner

| Velocità [°C/sec] | | |
|---|---|---|
| | immersa | emersa |
| 207 V | 0.238 | 0.487 |
| 230 V | 0.287 | 0.526 |
| 254 V | 0.264 | 0.772 |

Ponte termico in bronzo

Fig.15

| Velocità [°C/sec] | | |
|---|---|---|
| | immersa | emersa |
| 207 V | 0.342 | 0.698 |
| 230 V | 0.268 | 1,027 |
| 254 V | 0.33 | 0.754 |

Ponte termico in acciaio

Fig. 16

WASHING MACHINE, IN PARTICULAR A LAUNDRY MACHINE OR WASHING/DRYING MACHINE OR A DISHWASHER, EQUIPPED WITH A DEVICE FOR DETECTING THE TEMPERATURE OF THE ELECTRIC RESISTANCE USED FOR WARMING UP THE WASH LIQUID

RELATED APPLICATIONS

The present application is a 371 of International Application No. PCT/IB2009/000533 filed Mar. 17, 2009 by Indesit Company S.P.A. for a WASHING MACHINE, IN PARTICULAR A LAUNDRY WASHING OR WASHING/DRYING MACHINE OR A DISHWASHER, EQUIPPED WITH A DEVICE FOR DETECTING THE TEMPERATURE OF THE ELECTRIC RESISTANCE USED FOR WARMING UP THE WASH LIQUID, which is hereby incorporated by reference in its entierty.

BACKGROUND

The present invention relates to a washing machine, in particular a laundry washing or washing/drying machine or a dishwasher, equipped with a device for detecting the temperature of the electric resistance used for heating up the wash liquid. Washing and washing/drying machines are usually provided with a tub that houses a rotary drum in which the laundry to be washed is placed; the tub is filled with water taken from the water mains, to which washing agents such as detergents or softeners are added.

In order to improve the washing performance, a known solution provides for raising the temperature of the wash liquid (i.e. water and any washing agents) to values which may vary between approximately 30° C. and 90° C., depending on the desired type of wash; this temperature increase is obtained through an electric resistance secured to a wall of the tub, which resistance is turned on when it is submerged in the wash liquid (i.e. water only or water and washing agents) so as to exchange heat with the latter and bring it to the desired temperature, which is detected by a dedicated temperature sensor fitted within the tub.

Dishwashers are equipped with a tub that houses containers in which the crockery to be washed is placed; in this case as well, the wash liquid is heated by an electric resistance located on the tub bottom.

It is known that such electric resistances comprise a metal filament (which becomes hot by Joule effect when current is flowing through it) and a protective external covering, or "shield", adapted to insulate the filament electrically from the surrounding environment. For the purpose of preventing the resistance from overheating, devices have been developed for detecting a resistance threshold temperature and switching the resistance off once it has reached said temperature threshold, thus avoiding the risk of damage to the resistance itself, to the machine or to the load (laundry or crockery, according to the case) as well as the risk of a short circuit or a fire.

By "overheating temperature" it is generally meant the temperature at which the resistance gets damaged from heat; this temperature may vary according to the case as a function of the construction parameters of the resistance itself; in general, the temperature at which a washing machine's resistance is damaged by heat is approximately 800° C., but the temperature threshold set for triggering the devices adapted to switch off the power supply is normally lower in order to prevent any damage to the tub, which is often made of plastic.

Some of these devices detect the resistance temperature indirectly, e.g. by using, as a sensor, an electric fuse arranged in series with the electric resistance, so that when the current drawn by the resistance reaches a certain value, the fuse will melt and break the power supply to the resistance.

Though simple and effective, this solution does not allow to keep the temperature reached by the resistance directly under control: as a matter of fact, the melting of the fuse occurs as a function of the heat generated by Joule effect by the current flowing through it, and for this very reason the resistance temperature reading may in some cases be inaccurate.

Aiming at obtaining a more accurate detection of the resistance threshold temperature, other devices have been conceived which comprise a temperature sensor capable of detecting when said temperature is reached.

Some of these devices comprise microswitches controlled by a metal rod which expands when heated, thus opening the power supply circuit as soon as the resistance temperature reaches a threshold value.

Other devices are more generally fitted with a thermostatic switch that detects when the resistance reaches its threshold temperature, at which point it will break the power supply circuit.

Yet another system has been described in the European patent application published under number EP 0 579 170 in the name of CEBI S.p.A., wherein the power supply is switched off by means of an elastic element kept in position by a support adapted to melt as soon as the resistance threshold temperature is reached.

In general, washing machines are based on the principle of using devices for detecting the achievement of the threshold temperature and preventing the resistance from overheating, which devices comprise a sensing element specifically dedicated to that task and arranged in a watertight region of the machine, outside the tub.

Furthermore, although these devices perform their function correctly, it is nonetheless necessary to provide a dedicated housing in the machine and to prearrange the machine with a circuit specifically intended for this purpose.

When the sensor comprises elements adapted to melt under the action of heat, this implies a further drawback: in fact, every time the resistance reaches its threshold temperature it will be necessary to restore the electric continuity by replacing the melted part, which is a relatively long and difficult task.

The problem of the electric resistance getting overheated is also particularly felt when the machine includes a steam treatment cycle wherein steam is produced by means of the very same electric resistance housed in the tub, as described, for example, in the European patent EP1275767 to V-Zug AG; in such a case, in fact, the production of steam causes a proportional lowering of the level of the water in the tub, with a high risk that the resistance is left emerged from it.

Another known problem suffered by washing machines, in particular laundry washing and washing/drying machines or dishwashers, is that calcareous deposits accumulate on the surface of the resistance, thus reducing the latter's efficiency to a point where it may need to be replaced as a whole unit.

As known, scale is formed from deposited calcium and magnesium being present in the water supplied by the water mains, and creates a kind of "sleeve" or tubular coating that envelops the resistance.

In order to reduce the phenomenon of calcareous deposits, an anti-scale chemical product capable of reducing said deposits is typically added to the washing agents.

As an alternative, resistances are used whose external covering is made of ceramic and it is suitable for reducing the deposits of calcium and magnesium.

These solutions prove to be effective in reducing the speed at which calcium and magnesium are deposited; however, they are not definitive solutions, since it is common practice to periodically remove the deposits which have nevertheless accumulated or even replace the whole resistance, according to the circumstances. Also, it should not be overlooked that the addition of an anti-scale product to the washing agent in the former case, and the use of a special resistance being more expensive to manufacture in the latter case, imply drawbacks from an economical viewpoint.

SUMMARY

It is a first object of the present invention to provide a washing machine, such as a laundry washing or washing/drying machine or a dishwasher, comprising a device for detecting the temperature of an electric resistance housed in the tub and adapted to heat a wash liquid, which allows to reduce the number of components required for such a task.

It is another object of the present invention to provide a method for removing calcareous deposits from an electric resistance of a washing machine, in particular a laundry washing or washing/drying machine or a dishwasher, in a simple and inexpensive manner.

Further advantageous aspects or variants are also specified in the appended claims, which are intended as an integral part of the present description.

An idea which serves as a basis for the present invention is that of using the temperature sensor typically installed in the tub in order to detect the temperature of the wash liquid for detecting the temperature of the resistance as well, so that the latter can be prevented from overheating through suitable measures; a dedicated circuit will therefore be no longer required, thus making for a smaller number of components and lower production costs.

The temperature sensor normally installed in the tub is adapted to detect the temperature of the wash liquid in the tub.

In accordance with the teachings of the present invention, between the resistance and the sensor there is a so-called “thermal bridge”, i.e. the sensor and the resistance are put in a condition of thermal exchange by conduction.

As will be described in detail later on, the thermal bridge may simply be a thin rod or foil secured to both the sensor and the resistance; the material employed for manufacturing the thermal bridge is advantageously a good heat conductor, e.g. a metal; in this regard, it is conceivable to use to advantage stainless steel, bronze, copper or similar metals featuring high resistance to the chemical etching exerted by the wash liquid.

It is a further object of the present invention to provide a method for removing the calcareous deposits accumulated on the resistance surface; in fact, as known, all resistances of washing machines, dishwashers and the like inevitably tend to become encrusted with scale over time, thus needing maintenance or removal.

It is worth observing that calcareous scale impairs the thermal exchange between the wash liquid and the resistance, with ensuing consequences.

The present invention achieves the removal of calcareous deposits by means of one or more resistance heating and cooling thermal cycles, which are preferably carried out while the resistance is above the wash liquid.

The combination of a washing machine equipped with the device for measuring the resistance temperature and the method for removing calcareous deposits according to the present invention offers remarkable advantages: in fact, it provides for heating up the resistance, so as to cause it to expand, while keeping its temperature under control in order to prevent it from overheating beyond a preset temperature value, in a simple, safe and inexpensive manner.

BRIEF DESCRIPTION OF THE DRAWINGS

These features as well as further advantages of the present invention will become apparent from the following description of an embodiment thereof as shown in the annexed drawings, which are supplied by way of non-limiting example, wherein:

FIG. 15 is a table that shows the heating rate achieved when a bronze thermal bridge is used;

FIG. 16 is a table that shows the heating rate achieved when a steel thermal bridge is used.

DETAILED DESCRIPTION

Figure 1:
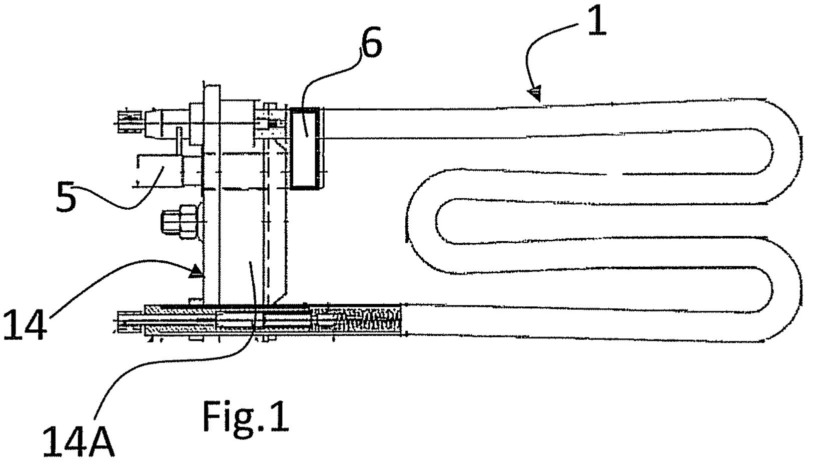
FIG. 1 shows an electric resistance and a sensor connected to a thermal bridge according to the present invention.
Figure 2:
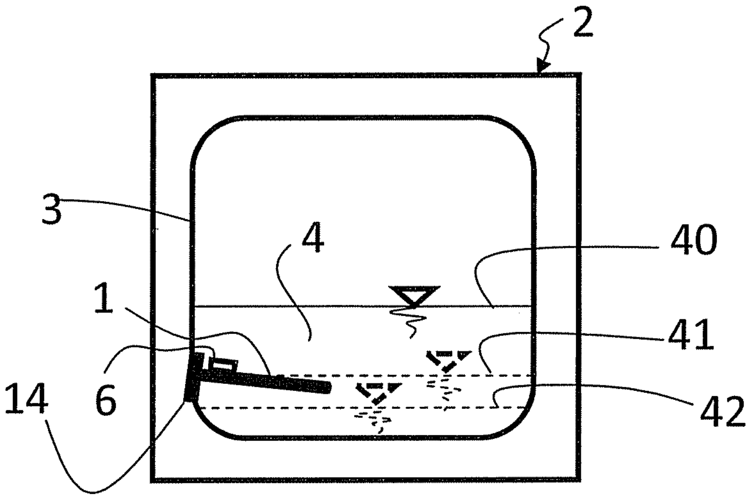
FIG. 2 is a schematic sectional view of a washing machine in which the resistance of FIG. 1 has been installed, with the tub in three different filling conditions.

Referring now to FIGS. 1 and 2, there is shown an electric resistance 1 for washing machines 2, in particular for laundry washing or washing/drying machines 2, of the type suitable for being placed in tub 3 of machine 2 for the purpose of heating wash liquid 4 contained therein.

Said wash liquid 4 may be simple water or else water and washing agents (e.g. softeners and/or detergents), according to the different operating stages of the machine; in FIG. 2 the wash liquid is shown with its surface in three different filling conditions of the tub, corresponding to as many conditions of resistance 1 below or above the wash liquid level.

When surface 40 of wash liquid 4 is above the highest point of resistance 1, the latter is completely submerged; when surface 42 of wash liquid 4 is below lowest point of resistance 1, the latter is completely emerged; when surface 41 of liquid 4 laps the resistance only partially, the latter is only partially submerged.

As is already noticeable, resistance 1 preferably extends with its axis slightly inclined relative to the water surface in order to provide advantages which will be discussed later on: in other words, the free end portion of the resistance is placed in the tub at a vertical height from the bottom which is lower than the height of the resistance portion associated with the vertical wall supporting it; therefore, the resistance portion immediately adjacent to the support plate is the one that emerges first from the wash liquid when the level of the latter in the tub decreases, thus offering a number of advantages which will be described below.

Figure 3:
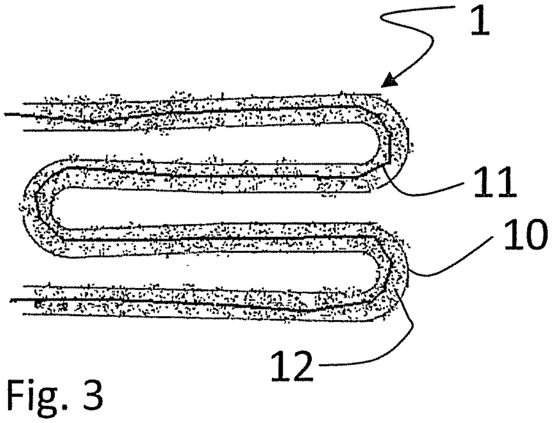
FIG. 3 is a sectional view of the electric resistance of FIG. 1.

Electric resistance 1 is per se known, and is normally of the so-called "armed" type, i.e. it is provided with a watertight external covering 10 within which there is an electric filament 11 surrounded by an insulator 12, as shown diagrammatically in FIG. 3.

Watertight covering 10 is typically made of a material providing resistance against the chemical etching exerted by the wash liquid, such as titanium, stainless steel or the like; resistance 1 is shown in the drawings as having a substantially coil-like shape, but more in general it may have any shape; preferably, its shape is such that it lies in a plane and is fitted in the lower portion of tub 3 in a manner such that said plane is slightly inclined relative to the surface of wash liquid 4, as shown diagrammatically in FIG. 2; of course, the watertight covering may also consist of two coverings made of different materials, one over the other, although for the purposes of the present invention they will be treated as a single covering.

The free ends of resistance 1 are located outside the tub and are provided with connectors (per se known and therefore not shown) for supplying power to electric filament 11 contained in covering 10.

FIG. 1 also shows a temperature sensor 5 of a per se known type fitted to washing machines for the purpose of detecting the temperature of wash liquid 4: such a sensor is of the type that includes a negative temperature coefficient thermistor, also referred to as NTC thermistor, i.e. an electric component whose resistance changes as a function of operating temperature.

NTC thermistors are, in particular, those thermistors in which the electric resistance value becomes smaller as temperature rises; as already mentioned, sensors provided with an NTC thermistor and suitable for being immersed in a liquid for the purpose of measuring temperature variations thereof are known in themselves; in short, they comprise a bulb which is placed inside the tub and which is in a condition of thermal exchange with the actual NTC thermistor.

The annexed figures show bulb 5*a* only, as the NTC thermistor is much smaller and it is installed at the base of or inside bulb 5*a* according to the type selected.

In any case, NTC thermistor detects the temperature on the surface of bulb 5*a*, which may be made of brass, stainless steel or the like; if the surface temperature is uneven (presence of hotter portions and colder portions), it may be reasonably expected that such uneveness will tend to disappear (the bulb material is in fact a good heat conductor).

Bulb 5*a* is shown in the drawings as having a circular cross-section and an ogive-shaped free end piece; more in general, it may however have any shape.

Sensor 5 is positioned adjacent to the resistance at essentially the same vertical height, thus being in the same submerged or emerged condition.

More in particular, sensor 5 and resistance 1 are both mounted to a support plate 14, which is in turn applied to the tub wall so as to create a watertight connection therewith. The support plate 14 normally includes a central portion 14A made of an elastomer, such as rubber or the like, and placed in a matching hole specifically provided in the tub wall; the elastomer is thus compressed axially, so that the deformation thereof creates a seal against the hole edges, while at the same time supporting both the resistance and sensor 5.

In accordance with the teachings of the present invention, electric resistance 1 is put in a condition of thermal exchange by conduction with sensor 5, so that the latter can also detect the resistance temperature: this is achieved through thermal bridge 6.

Figure 4A:
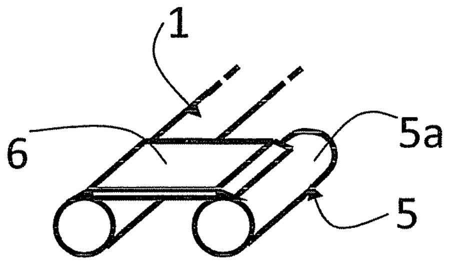
FIGS. 4*a* and 4*b* are two different views of a first embodiment of the thermal bridge of FIG. 1.
Figure 4B:
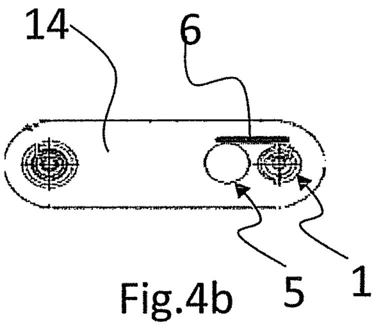
Figure 5A:
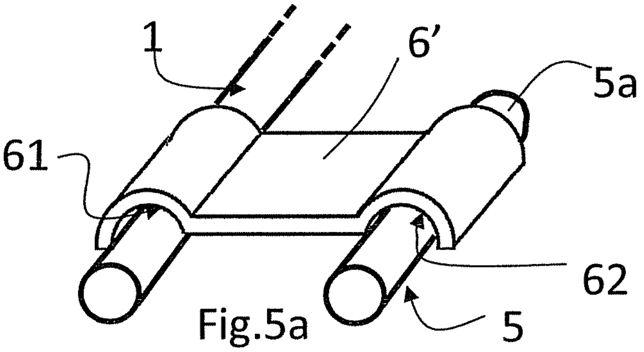
FIGS. 5*a* and 5*b* are two different views of a second embodiment of the thermal bridge of FIG. 1.
Figure 5B:
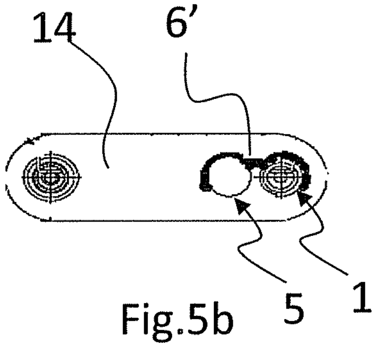
Figure 6A:
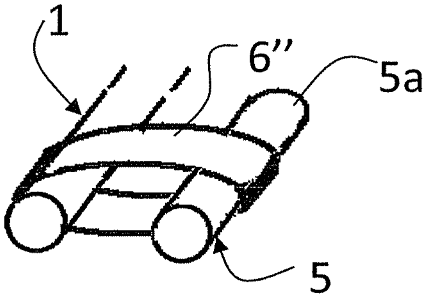
FIGS. 6*a* and 6*b* are two different views of a third embodiment of the thermal bridge of FIG. 1.
Figure 6B:
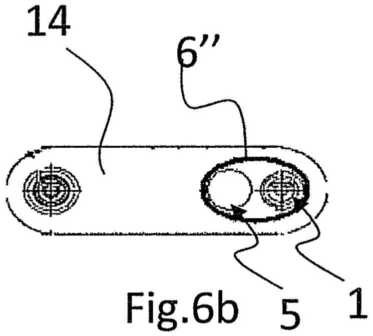

More in detail, FIG. 1 as well as FIGS. 4*a* and 4*b* show that resistance 1 and sensor 5 are joined by a foil 6 which constitutes a real "thermal bridge" between the two, thus putting them in a condition of thermal exchange by conduction; to this end, foil 6 must be made of a material which is a good heat conductor, such as a metal.

It should be stated beforehand that a thermal bridge may also be obtained by placing sensor 5 directly in contact with resistance 1 (e.g. by welding the former to the latter), or through a wire or another element being a good heat conductor and having any shape; however, the use of a foil, or more in general of a laminar body, offers a number of additional advantages, which will be described below.

Using a metal for creating the thermal bridge is advantageous in many respects: in addition to being generally good heat conductors, metals can be worked easily and are resistant to the chemical etching exerted by the wash liquid; in this regard, it is advantageously conceivable to use metals such as bronze, steel, copper, titanium or the like, all of which may possibly be coated with a protective layer.

Two main operating conditions can be identified: a first condition in which resistance 1 and sensor 5 are completely submerged in the wash liquid (shown in FIG. 1, where surface 40 is above resistance 1) and a second condition in which resistance 1 and sensor 5 are emerged (shown in FIG. 1, where surface 42 is underneath resistance 1). In the first condition (resistance 1 and sensor 5 completely submerged), when the resistance is on sensor 5 is subject to thermal exchange by conduction with the thermal bridge and by convection with the wash liquid; in its turn, the thermal bridge is subject to thermal exchange by conduction with both resistance 1 and sensor 5 and by convection with liquid 4: in this case, the small dimensions of thermal bridge 6 (compared to those of the resistance), together with its laminar shape (with a large exchange surface per volume unit) cause much of the heat transmitted by resistance 1 to thermal bridge 6 to be exchanged by the latter with wash liquid 4.

It can therefore be reasonably asserted that in this condition the effects of the thermal exchange by convection between sensor 5 and wash liquid 4 prevail over the effects of the thermal exchange by conduction between sensor 5 and thermal bridge 6; as a result, the temperature reading taken by sensor 5 can be deemed in good approximation to be close to the actual temperature of wash liquid 4.

In the second condition (resistance 1 and sensor 5 emerged), when the resistance is on sensor 5 is subject to thermal exchange by conduction with the thermal bridge and by convection with the air; in its turn, thermal bridge 6 is subject to thermal exchange by conduction with both resistance 1 and sensor 5 and by convection with the air: in this case, much of the heat transmitted by resistance 1 to thermal bridge 6 is exchanged between the latter and sensor 5.

It can therefore be reasonably asserted that in this condition the temperature reading taken by sensor 5 can be deemed in good approximation to be close to the temperature of resistance 1.

Figure 7A:
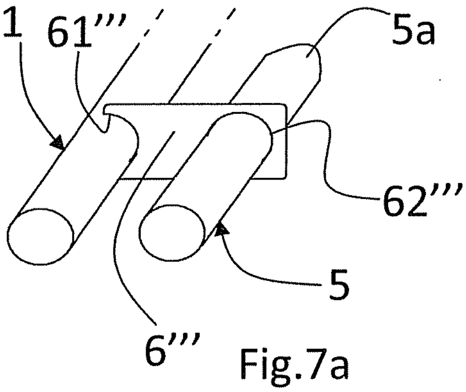
FIGS. 7*a* and 7*b* are two different views of a fourth embodiment of the thermal bridge of FIG. 1.
Figure 7B:
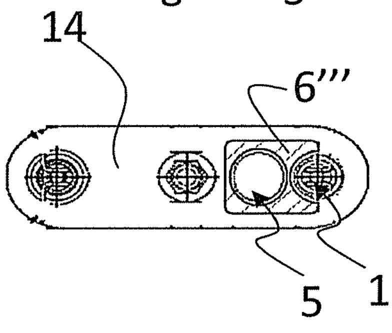

It is important to underline that this effect is improved and optimized by the foil-like shape of the thermal bridge; in other words, the latter is provided in the form of a (more or less curved) flat metal body extending between the sensor and the resistance and arranged in a manner such that the largest surface of the flat body is the one which is in contact with the resistance and the sensor, especially when the thermal bridge is made of titanium, steel or the like; if a material having better heat conduction characteristics is used, such as copper, the thermal bridge may however have different shapes, as shown by way of example in the following FIGS. 7*a* and 7*b*.

Since resistance overheating occurs mainly when the resistance is in the emerged condition, thanks to the teachings of the present invention it is also possible, by using just one temperature sensor 5, to prevent electric resistance 1 from overheating: in fact, it is thus possible to detect the temperature reached by the resistance as well as to provide that, when a threshold temperature is reached, the power supply will be switched off by means of a suitable switch.

Advantageously, this makes it possible to use a single temperature sensor for detecting both the wash liquid temperature and the resistance temperature; sensor 5 is in communication with a control unit or a microprocessor or an electric circuit, so that the resistance power supply can be switched off as soon as the wash liquid temperature reaches a preset value and/or the resistance temperature exceeds a selected safety value. Of course, the sensor cannot directly detect whether the resistance is submerged or not; this detection can nevertheless be obtained indirectly; in fact, when the resistance is submerged the temperature detected by the sensor cannot exceed 100° C. (at which temperature the wash liquid evaporates), whereas when the resistance is emerged the temperature can rise to 140° C. and above; an extremely advantageous variation of the control method will be discussed later on in more detail with reference to FIGS. 13-15. In a third operating condition, surface 41 of the wash liquid is essentially at the same height as resistance 1.

In this condition, the emerged portion of resistance 1 will tend to become overheated, while the submerged portion will remain in normal operating conditions.

When the washing machine is operating, situations may actually occur where resistance 1 stays emerged only partially, e.g. because surface 41 of wash liquid 4 is at about the same height as resistance 1: such a condition may arise either due to a malfunctioning water supply solenoid valve, which causes insufficient water supply, or to a malfunctioning drain system, which for example lets a certain quantity of wash liquid leak into the drain; this condition may also occur in those machines that include a steam treatment cycle, wherein steam is produced by heating the wash liquid through resistance 1.

In all these cases, the upper regions of the resistance stay emerged and are potentially subject to overheating because they no longer benefit from a thermal exchange with the wash liquid.

In order to prevent overheating in this intermediate condition, it is provided that thermal bridge 6 is placed at a height such that, as soon as surface 41 of liquid 4 begins to expose the resistance, it switches from the submerged condition to the emerged condition.

This can be attained, for example, by mounting resistance 1 slightly at an angle, as shown in FIG. 2, so that the end thereof which is associated with thermal bridge 6 is higher than the opposite end.

In FIG. 1 thermal bridge 6 is placed adjacent to plate 14, thus connecting resistance 1 and sensor 5 in the resistance portion that is also adjacent to plate 14; in such a situation, the assembly consisting of resistance 1, plate 14, sensor 5 and thermal bridge 6 is mounted in a manner such that the latter is higher than the resistance and remains in the emerged condition.

In this condition, the presence of thermal bridge 6 (which is adapted to connect the higher surface portion of resistance 1 to sensor 5) allows the sensor to detect an increase in the resistance temperature, and consequently allows the control unit to take appropriate measures, e.g. turning off the resistance or adding water (from the mains).

Thermal bridge 6 of FIGS. 4*a* and 4*b* has a substantially flat shape and is welded or glued to resistance 1 and to sensor 5 at two edges; as can be seen, thermal bridge 6 is associated with resistance 1 and with sensor 5 so as to join together the outer surfaces thereof that in the assembled (operating) condition are located highest.

Referring now to FIGS. 5*a*, 5*b* and 6*a*, 6*b*, there are shown two alternative embodiments 6' and 6" of the thermal bridge and of the portions thereof which interface with resistance 1 and sensor 5.

Thermal bridge 6' is provided with two mounting seats 61 and 62, each having a cavity adapted to be coupled by interference fit to resistance 1 and to sensor 5, respectively: this thermal bridge 6' offers the advantage that it does not require complex installation work and can be installed after the components have already been mounted in position; furthermore, it can also be installed in existing washing machines, without needing any specific prearrangement.

The advantage attained by using this type of thermal bridge 6' is rather important when we consider how the various parts are installed: the resistance ends and the sensor are first inserted in position into the holes provided in elastomer 14A fitted to plate 14.

The plate is then inserted into the hole in the tub wall and the elastomer is compressed axially (e.g. by tightening bolts, nuts and flanges), so that the elastomer deforms peripherally and presses against the wall hole edges, thus exerting a sealing and supporting action.

Installing thermal bridge 6' is therefore extremely easy, since it is sufficient to position it onto the resistance and the sensor and to exert pressure onto it in order to couple it by interference to the latter: in fact, due to its material and foil-like shape, the thermal bridge deforms slightly under the force exerted by the operator, thus providing a snap-type coupling with the resistance and the sensor without requiring further coupling measures (welding, glueing or the like).

On the other hand, thermal bridge 6" simply consists of a ring or a band extending between resistance 1 and sensor 5, thus putting them in a condition of thermal exchange by conduction, as previously explained.

FIGS. 7*a* and 7*b* show a thermal bridge 6''' provided in the form of a substantially flat plate arranged transversally between resistance 1 and sensor 5, so that only its smaller face, i.e. its thickness, touches said components.

This embodiment has proven to be advantageous especially when thermal bridge 6''' is made of copper, since it ensures sufficient heat conduction for the purposes of the present invention even though the contact area is very small.

Thermal bridge 6''' has a hole 62''' at one end through which sensor 5 is inserted; in order to achieve good contact, the coupling between thermal bridge 6''' and the sensor is to be provided through interference fit, thus attaining two advantages: in fact, heat conduction is optimised (by ensuring contact between the two surfaces), and sensor 5 and thermal bridge 6''' can be mounted easily without needing further coupling means. At the end opposite to the one with hole 62''', thermal bridge 6''' has a flare 61''' that houses resistance 1 the flare is semicircular and is afferent to one of the sides of thermal bridge 6''', so that mounting resistance 1 turns out to be an extremely simple task; for the purpose of securing resistance 1 to thermal bridge 6''', in the area of housing flare 61''' there is a caulking between said two elements which prevents them from detaching from each other accidentally: thermal bridge 6''' is coupled to sensor 5, and the opposed arms that define housing flare 61''' are pressed against the resistance so as to prevent any liquid from penetrating into the interface area between the resistance and the thermal bridge itself.

In any case, it should be noted that all of thermal bridges 6, 6', 6'', 6''' extend between resistance 5 and sensor 6, and connect together at least the upper portions thereof.

In addition, both resistance 1 and sensor 5 are placed at essentially the same height inside the tub and preferably lie in the same plane: this is advantageous when resistance 1 is only partially emerged, as described above; for this purpose, resistance 1 and sensor 5 are preferably mounted to plate 14 aligned to each other.

In substance, in a washing machine like a laundry washing or washing/drying machine or a dishwasher, temperature sensor 5 is used for detecting both the temperature of the wash liquid and the temperature of resistance 1, thus allowing to prevent the resistance from overheating in an inexpensive and safe manner, while reducing the number of components and facilitating the machine assembly operations.

Referring back to the thermal bridge, the resistance and the sensor bulb, it is appropriate to point out that the use of steel, preferably stainless steel, for manufacturing these components bestows further advantages on the present invention: in fact, said components will thus have the same thermal expansion coefficient, so that when subjected to temperature variations they will deform in a similar manner, thereby always ensuring a good mechanical coupling. This also implies that the condition of heat exchange by conduction will be optimal at all times, thus allowing the sensor to detect the temperatures correctly, with only limited deviations or no deviations at all.

In this regard, it should be noted that when the thermal bridge is of the type 6' (i.e. it can be coupled to the sensor and to the resistance without requiring further coupling means in addition to the interference fit provided by the shapes of the components alone), if the material of the thermal bridge and that of the resistance or of the bulb are different, a gap will be generated following a rise in temperature. This gap, caused by the different thermal expansion of the different materials, will determine improper heat transmission by conduction and will therefore lead to inaccurate readings. Moreover, the wash liquid will naturally flow in the gap thus generated, thus involving the risk that scale is formed in the coupling area; since scale is an insulator, it is apparent that any formation of calcareous deposits in the coupling areas between the thermal bridge and the bulb or the resistance is especially undesirable, in that it would reduce the thermal exchange by conduction and cause inaccurate readings.

As aforementioned, these problems are prevented by using the same material for manufacturing the armed resistance, the thermal bridge and the sensor bulb, thus ensuring optimal heat conduction and correct temperature readings by the sensor.

More in particular, it is appropriate to use steel, preferably stainless steel, because at the temperatures reached in the washing machine this material deforms less than other commonly used materials, such as bronze.

Figure 13:
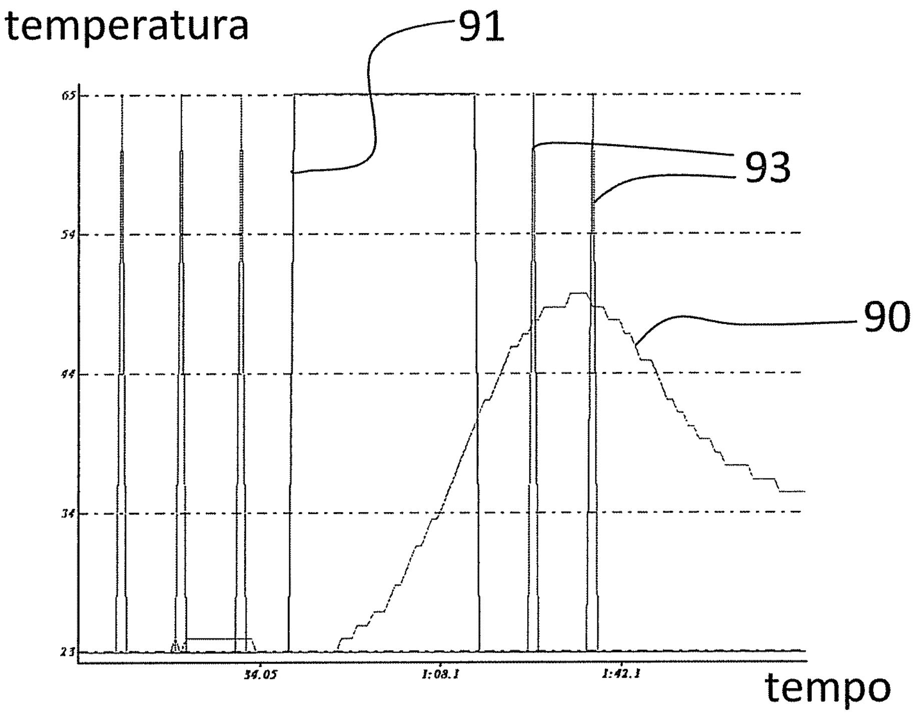
FIG. 13 shows a time-temperature graph which is obtained in a washing machine as power is supplied to the resistance when the latter is above the wash liquid.

Referring now to FIG. 13, it illustrates a method for detecting operating conditions (submerged or emerged condition) of the resistance of a washing machine, which method utilizes a resistance, a thermal bridge and a sensor as described above.

The method is based on the idea of establishing a parameter based on which it is evaluated if the resistance is in the emerged condition, and appropriate actions are taken in order to bring it back into the submerged condition; for this purpose, the heating of the liquid in the tub occurs in stages, or steps, by turning on the resistance for a plurality of time periods, wherein at the end of each activation period the temperature detected by the sensor is read in order to know whether the resistance is in the submerged or in the emerged condition: in the former case, the resistance is turned on again in order to carry out a new heating step, whereas in the latter case, in addition to turning on the resistance, the method also provides for energizing the solenoid valve that supplies water from the mains to which the household appliance is connected, in order to submerge the resistance again.

Figure 14:
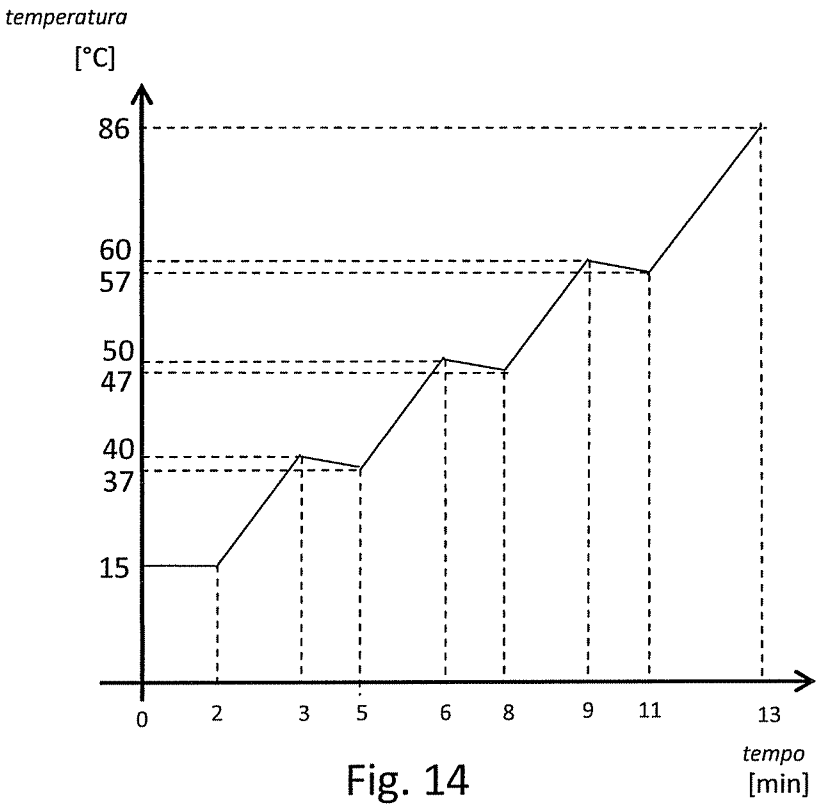
FIG. 14 shows the step of heating a liquid in a tub according to a method for detecting an emerged or submerged condition of the resistance.

According to a first embodiment of the method, described herein with reference to FIGS. 13 and 14, the heating cycle of the wash liquid contained in the tub is ideally subdivided into a plurality of steps, each corresponding to a liquid temperature increase of approximately 10° C.

With reference to FIG. 14, the cycle starts by supplying water into the tub for about 2 minutes, until the water level becomes higher than the resistance level; during this step, the temperature detected by the sensor is approximately 15° C.

At the end of the water supply step, i.e. when two minutes have elapsed, the electric resistance is turned on for about one minute in order to raise the detected temperature to a value of approximately 40° C.

The electric resistance is then turned off for a certain period of time, e.g. two minutes, thus bringing about a temperature drop which can be observed in FIG. 14 between minutes three and five, if the resistance is submerged; in this case, the temperature drops by about three degrees to a value of 37° C.

Should the resistance be emerged, the situation shown in FIG. 13 would occur, with the temperature exceeding 40° C. and reaching a threshold value.

The graph of FIG. 13 in fact illustrates the condition wherein the resistance is not submerged: X axis indicates time and Y axis indicates temperature, expressed in ° C.; curve 90 represents the progress of the temperature detected by sensor 5; curve 91 represents the resistance on time; curves 93 show the activations of the solenoid valve that controls the supply of water into the tub from the mains (to which the washing machine is connected through said solenoid valve).

As a consequence of the electric resistance being turned on (for a certain period of time, as indicated by curve 91), the temperature (curve 90) begins to rise.

When the resistance is turned off, two situations may occur: either the temperatures continues to rise up to a threshold value or it remains lower than the threshold value.

This latter case corresponds to a situation in which the resistance is submerged, as shown in FIG. 14; in the former case, shown in FIG. 13, since the resistance is emerged the sensor detects that the temperature keeps on rising even after the resistance has been turned off, until it reaches a preset threshold value.

This condition, i.e. the detection of a rise in temperature beyond a certain threshold when the resistance is off, indicates that the resistance is at least partly emerged; therefore, as soon as the threshold temperature (in this case set to approximately 47° C.) is reached, the water supply solenoid valve is also controlled, as indicated by the two subsequent activations 93 thereof, in order to submerge the resistance again, so that the temperature begins to drop.

The temperature value is read by the sensor during the pause period: if said value is equal to or greater than the first threshold value (said threshold value being set beforehand to approximately 47° C., for example), there will be an indication that the resistance is at least partly emerged, so that water will be supplied into the tub in a quantity considered to be sufficient to cover the electric resistance or at least to cause a temperature drop.

On the contrary, no water will be supplied into the tub if the temperature reading is smaller than said first threshold value, as in the case shown in FIG. 14.

Referring to this latter figure again, at minute five the electric resistance is turned on again for one minute, i.e. until minute six at which the detected temperature should be about 50° C.

Subsequently, from minute six to minute eight, i.e. for two minutes, there is a repetition of the above-described step wherein the resistance is turned off and the temperature variation is measured in order to check if the resistance has remained at least partly emerged (in this case the comparison is made between the temperature reading and a second threshold value, said second threshold value being preset to approximately 55° C.; again, should said second threshold value be reached or exceeded by the measured temperature value, a predetermined quantity of water will be supplied into the tub).

The resistance is then turned on again for one minute, until a temperature of approximately 60° C. is reached at minute nine.

The resistance is then turned off again for two minutes, until minute eleven, in order to verify the machine's operating parameters as described above with reference to the previous resistance deactivations (in this case the comparison is made between the temperature reading and a third threshold value, said third threshold value being preset to approximately 65° C.; again, should said third threshold value be reached or exceeded by the measured temperature value, a predetermined quantity of water will be supplied into the tub).

At minute eleven the resistance is turned on again for two minutes, so that the water temperature rises to approximately 86° C. and the wash treatment is started.

Of course, should the wash treatment require a lower temperature, the above-described heating cycle will simply have to be stopped earlier.

It is likewise important to point out that the treatment temperature may be obtained, for example, through a different number of steps of successive resistance activations and deactivations, e.g. one, two, three, four, five or more steps as required, without departing from the teachings and the scope of the present invention.

Alternatively, according to a variation of the method, the emerged condition of the resistance is verified by detecting the temperature rising rate, which will be different depending on whether the resistance is emerged from or submerged in the wash liquid. FIGS. 15 and 16 are two tables referring to a bronze thermal bridge and to a steel thermal bridge, respectively.

These tables indicate limit values below or above which the resistance is presumably in the submerged or emerged condition, respectively. Such values are expressed as a function of the resistance supply voltage; for example, when the resistance supply voltage is 230 V, up to a value of 0.287° C./sec the resistance is considered to be submerged; past said value the resistance is considered to be at least partly emerged, until a value of 0.526° C./sec is reached, at which the resistance is considered to be completely emerged.

As an alternative to what has been described above with reference to FIG. 14, the method may therefore evaluate the rate at which the temperature rises when the resistance is on, and compare said rate with threshold rates, thus identifying conditions wherein the resistance is submerged, emerged or partly emerged and acting accordingly in order to prevent it from overheating, e.g. by supplying cold water into the tub.

In this variant it is no longer necessary to compare the temperature reading with threshold values, since it is sufficient to analyze how the temperature changes over time, thus omitting or anyway drastically reducing the time periods during which the resistance stays off in order to allow a temperature rise to be evaluated (as described above), resulting in a faster heating cycle.

Figure 8:
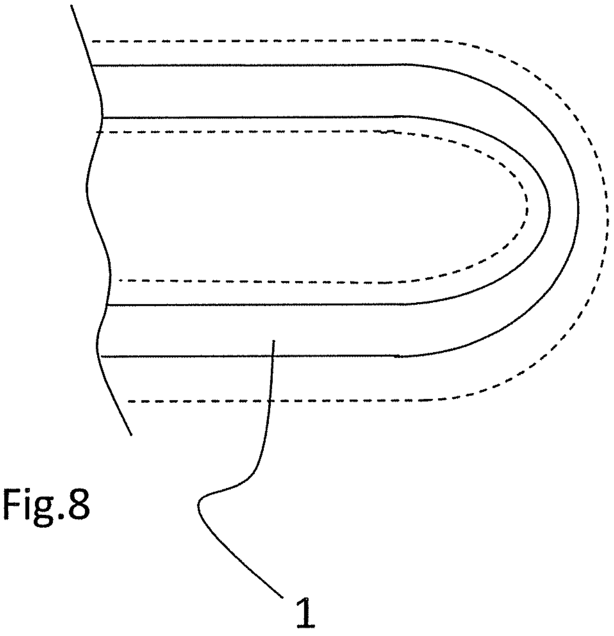
FIG. 8 shows an electric resistance in the expanded and idle conditions.
Figure 9:
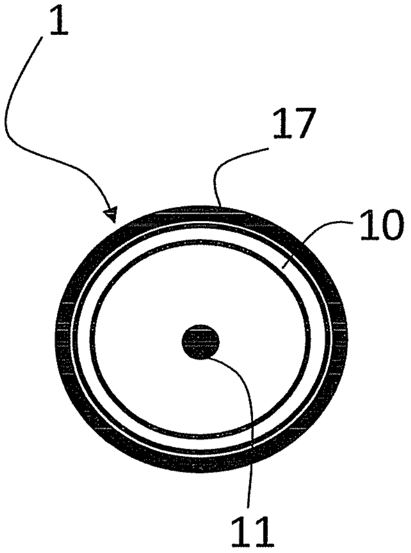
FIGS. 9 and 10 show sections of the resistance of FIG. 8 in the idle and expanded conditions.
Figure 10:
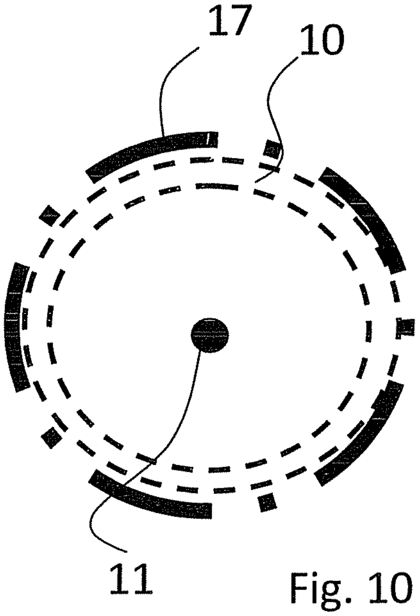

Referring now to FIGS. 8, 9 and 10, there is shown an electric resistance 1 for washing machines in two operating conditions: the continuous line outlines resistance 1 when it is at ambient temperature, whereas the dashed line outlines the resistance when it is subjected to heating: as known, in fact, a metallic material expands when heated.

It should be noted that in FIGS. 8, 9 and 10 the size ratio between the resistance at ambient temperature and the heated resistance has been exaggerated in order to illustrate this phenomenon more clearly.

Scale 17 accumulated on the outer surface of the resistance is a rigid material, and its thermal expansion is less than that of the metal of casing 10 of resistance 1.

The resistance is of the aforementioned "armed" type, and the external casing 10 thereof is advantageously made of titanium, steel or the like and contains a filament 11 through which current flows for generating heat by Joule effect.

The choice of titanium as a material for external casing 10 proves to be very advantageous because it has a high thermal expansion coefficient (it expands more than other metals for the same temperature rise).

In accordance with the teachings of the present invention, the removal of calcareous deposits 17 accumulated on the outer surface of the resistance, as shown in FIG. 9, is promoted by means of at least one resistance heating cycle which causes a greater expansion than is normally achieved in normal operation when the resistance is in the submerged condition: in this manner, calcareous deposits break and scale removal is facilitated, as shown in FIG. 10.

This is obtained, for example, by heating the resistance to temperatures in the range of 150° C. to 300° C., so as to achieve a sufficient expansion; this effect may advantageously be obtained when the resistance is emerged, so as to cause a greater expansion than is normally achieved in normal operation (in the submerged condition).

As a result, the dimensions of resistance 1 (i.e. of external casing 10 in this particular instance) will exceed the corresponding dimensions achieved in normal operation: since scale does not expand, or at any rate it expands less, the resistance will press against the surrounding calcareous deposits, hence causing them to break and come off at least partly, as can be understood by comparing FIGS. 9 and 10.

It has been observed that the best effects are attained by heating and cooling the resistance several times, in particular at least three consecutive times.

An advantageous method for heating the resistance in close succession provides for using a simple relay arranged upstream of the resistance, which relay can control the resistance power supply so that the resistance is subjected to one or more heating and cooling cycles.

The method for removing calcareous deposits according to the present invention therefore includes the following steps:

bringing the resistance in the emerged condition;

turning on the resistance until it reaches a temperature Tdil which is at least higher than the operating temperature in the submerged condition;

turning off the resistance in order to let it cool down to a temperature Trest.

More in particular, tests have shown that the best effect are attained when temperature Tdil is between 150° C. and 300° C. and temperature Trest is ambient temperature.

It should be observed that in any case temperature Tdil is lower than the resistance overheating temperature, meaning by this the temperature at which the resistance is damaged by the heat generated, which temperature may vary according to the case as a function of the construction parameters of the resistance itself.

Figure 11:
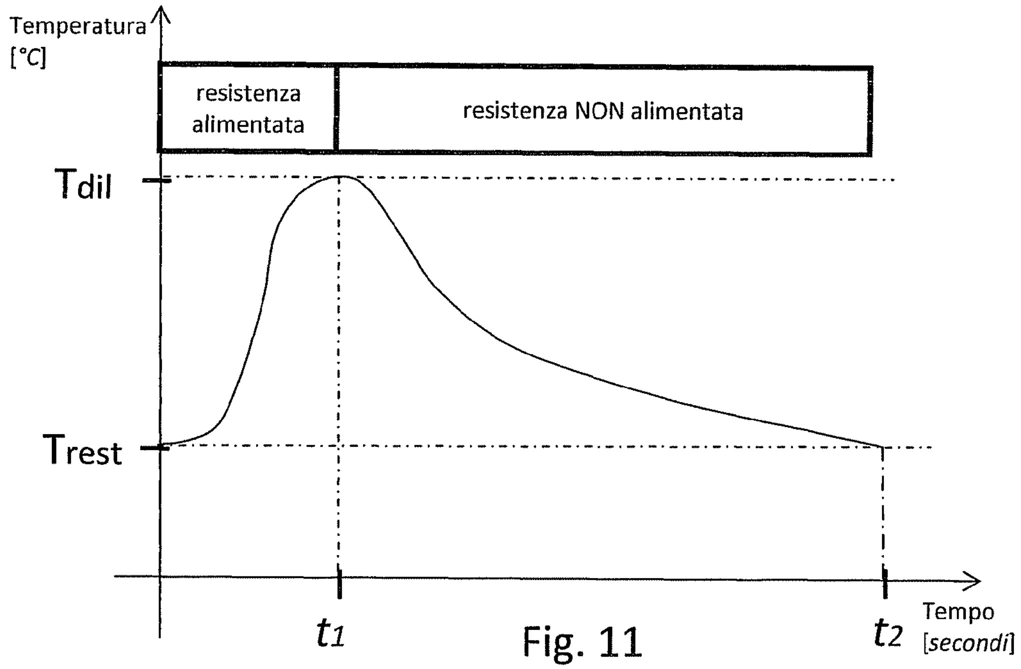
FIG. 11 illustrates a heating and cooling cycle for removing calcareous deposits according to the present invention.
Figure 12:
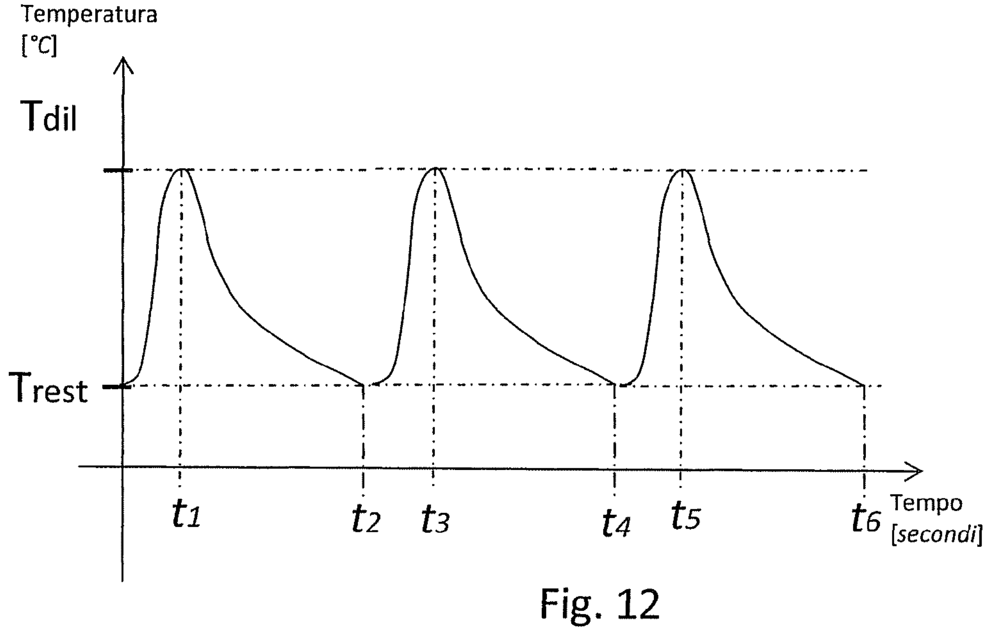
FIG. 12 shows another heating and cooling cycle for removing calcareous deposits which comprises several heating and cooling steps.

An example of this is shown in the graphs of FIGS. 11 and 12

FIG. 11 shows the trend of the resistance temperature over time: X axis indicates time and Y axis indicates resistance temperature; the on/off state of resistance 1 is indicated above.

In substance, starting from the initial temperature Trest, e.g. corresponding to an ambient temperature of 20° C., the resistance (in the emerged condition) is turned on for a time t1 (e.g. 45 seconds) until it reaches temperature Tdil (e.g. 300° C.). Once said temperature has been reached, the resistance is turned off and is let to cool down for a time t2-t1 (e.g. 600 seconds) until resistance 1 returns to temperature Trest.

FIG. 12 shows a thermal cycle which comprises three heating and cooling steps substantially similar to the one of FIG. 11.

By way of example, temperature Tdil may have values in the range of 150° to 300° C., whereas temperature Trest may have values in the range of 10° C. to 50° C.

Of course, many variations are still possible; for example, it is conceivable to cool resistance 1 forcedly by supplying water into the tub, in which case the resistance cooling speed will be considerably faster, but at the cost of a much increased water consumption.

According to another possible variant, it is conceivable that temperature Tdil is reached and maintained for a certain period of time before the cooling starts (with either air or water).

The scale removal cycle, whether consisting of a single heating step followed by a cooling step or of multiple steps, may be activated manually by the user, e.g. by acting upon a control unit of the machine, or else it may be automated and activated after a predetermined number of wash cycles.

In principle, it is conceivable to employ known methods for detecting the temperature of the resistance in order to prevent it from overheating beyond temperature Tdil and being damaged, e.g. by using a protective thermal fuse, and to ensure that the temperature will not exceed preset values.

As an alternative, it is conceivable to use to advantage the detection device according to the present invention, in the manner described above, thereby obtaining remarkable advantages in terms of removal of calcareous deposits and detection of the maximum temperature reached by the resistance.

In this regard, it should be highlighted that by using the above-described temperature detection device according to the present invention it is possible to detect not only the achievement of the resistance threshold temperature, but also the achievement of temperatures Tdil and Trest as well as the resistance temperature variations over time, all of which is beneficial for optimal control.

The invention claimed is:

1. A washing machine, in particular a laundry washing or washing/drying machine or a dishwasher, comprising:

a tub adapted to contain a wash liquid, an electric resistance for heating the wash liquid, and a temperature sensor positioned for detecting a temperature of the wash liquid, the temperature sensor being further coupled to a first end of the electric resistance and being in a condition of thermal exchange by conduction with the electric resistance for detecting a resistance temperature of the electric resistance, the first end of the electrical resistance being coupled to a wall of the tub and a second end of the electrical resistance being free and not coupled to the tub, and the electric resistance being positioned at an angle within the tub so that the first end of the electric resistance is at a higher position, with respect to the bottom of the tub, than that of the second end of the electric resistance.

2. The washing machine of claim 1, wherein the temperature sensor is configured to detect the temperature of the electric resistance and to detect a possible overheated condition of the electric resistance.

3. The washing machine according to claim 1, wherein the electric resistance is subjected to at least one heating cycle and cooling cycle while the electric resistance is kept above the wash liquid to remove calcareous deposits from the electric resistance.

4. The washing machine according to claim 1, further comprising a support plate configured to connect to the wall of the tub, the temperature sensor and the first end of the electrical resistance being mounted to the support plate.

5. The washing machine according to claim 1, where the angled electrical resistance is determined to be at least partially emerged from water when the electrical resistance is in an off state and the temperature sensor detects a rise in the temperature to a threshold value, and water is supplied to the tub in response to determining that the angled electrical resistance is at least partially emerged from water.

6. The washing machine according to claim 1, wherein the condition of thermal exchange by conductor is obtained through a thermal bridge comprising a metal element extending between the electric resistance and the temperature sensor.

7. The washing machine according to claim 6, wherein the thermal bridge comprises a metal body.

8. The washing machine according to claim 6, wherein the electric resistance lies in a plane which is inclined with respect to a surface of the wash liquid.

9. The washing machine according to claim 6, wherein the temperature sensor is a negative temperature coefficient thermistor that includes a bulb to be immersed into the wash liquid, the electric resistance including a watertight covering to be immersed into the wash liquid, and the thermal bridge being in contact with both the bulb and the watertight covering.

10. The washing machine of claim 9, wherein the temperature sensor is configured to detect the temperature of the electric resistance and to detect a possible overheated condition of the electric resistance.

11. The washing machine according to claim 6, wherein the electric resistance, the thermal bridge, and the temperature sensor are substantially at the same height relative to a surface of the wash liquid.

12. The washing machine according to claim 11, wherein the electric resistance lies in a plane which is inclined with respect to the surface of the wash liquid.

13. The washing machine according to claim 11, wherein the temperature sensor is a negative temperature coefficient thermistor that includes a bulb to be immersed into the wash liquid, the electric resistance including a watertight covering to be immersed into the wash liquid, and the thermal bridge being in contact with both the bulb and the watertight covering.

14. The washing machine according to claim 13, wherein, the electric resistance lies in a plane which is inclined with respect to the surface of the wash liquid.

* * * * *

UNITED STATES PATENT AND TRADEMARK OFFICE

CERTIFICATE OF CORRECTION

PATENT NO. : 8,882,346 B2
APPLICATION NO. : 13/120201
DATED : November 11, 2014
INVENTOR(S) : Bombardieri et al.

It is certified that error appears in the above-identified patent and that said Letters Patent is hereby corrected as shown below:

In the Specification:
Col. 1, line 20 should read:
reference in its entirety.

Col. 5, line 55 should read:
expected that such unevenness will tend to disappear (the bulb Col. 8, line 45 should read:
further coupling measures (welding, gluing or the like).

In the Claims:
Claim 6 should read:
condition of thermal exchange by conduction is obtained Signed and Sealed this
Twenty-fifth Day of August, 2015

Michelle K. Lee

Michelle K. Lee
*Director of the United States Patent and Trademark Office*